Sept. 6, 1960

C. M. HAWKINS 2,951,540

PROPELLER BRAKE

Filed Nov. 5, 1956

INVENTOR.
Cyril M. Hawkins
BY
Paul Fitzpatrick
ATTORNEY.

Sept. 6, 1960

C. M. HAWKINS 2,951,540

PROPELLER BRAKE

Filed Nov. 5, 1956

INVENTOR.
Cyril M. Hawkins
BY
Paul Fitzpatrick
ATTORNEY.

United States Patent Office

2,951,540
Patented Sept. 6, 1960

2,951,540

PROPELLER BRAKE

Cyril M. Hawkins, Indianapolis, Ind., assignor to General Motors Corporation, Detroit, Mich., a corporation of Delaware Filed Nov. 5, 1956, Ser. No. 620,270

15 Claims. (Cl. 170—135.75)

This invention relates to brakes and more particularly to a brake for an aircraft propeller.

The invention is particularly applicable to brakes for propellers driven either by piston type or gas turbine engines, in arrangements wherein either a single engine or plurality of engines drive either a single propeller or more than one propeller. The principles of the invention may also be applied to braking power elements in other fields than the field of aircraft propulsion.

It is highly desirable that when aircraft engines are inoperative a brake be applied to hold the propeller from rotation in either direction. It is also desirable that this brake be released upon starting the aircraft engine, that the brake be controlled to absolutely prevent reverse rotation of the propeller during flight, and that the brake be prevented from being applied during periods of operation wherein applications of the brake would be harmful to the engine, the propeller, or the brake itself. It is further desirable that the brake be applied only when the propeller is rotating at low speeds so as to minimize brake wear and yet at the same time to ensure that when the brake is applied it is applied with sufficient force to perform its function without undue slipping.

Various brake controls have been utilized to operate propeller brakes according to the above desired conditions, such brakes being shown in the applications of Victor W. Peterson, S.N. 231,465, filed June 14, 1951, and S.N. 313,960, filed October 9, 1952. The propeller brakes shown in the Peterson applications utilize springs to normally apply the brake, static and centrifugal hydraulic pressure to release the brake, and self-energizing helical splines to apply the brake upon reverse propeller operation. The Peterson application S.N. 313,960 also shows self-energizing helical splines to release the brake during starter operation.

This invention is an improvement on the brakes of the above-mentioned application and adds a mechanical brake release hold to aid the centrifugal pressure brake release in preventing brake application upon failure of the static pressure brake releasing means and also to lower the propeller speed at which the brake is applied upon engine failure or shutdown and thus increase the life of the brake wearing surfaces.

The invention is described herein in terms of its preferred embodiment in an aircraft power plant comprising an engine, a power transmission and a variable pitch propeller. The power plant is provided with a starter for starting the power plant and a brake for preventing rotation of the propeller while the engine is inoperative.

It is therefore an object of the invention to provide an improved power plant, particularly one of the turboprop type, to provide an improved braking arrangement for the power plant and to provide an improved brake and control particularly suited for the type of application described above.

Further objects and advantages of the present invention will be apparent from the following description, reference being had to the accompanying drawings wherein a preferred form of the present invention is clearly shown.

Figure 1:
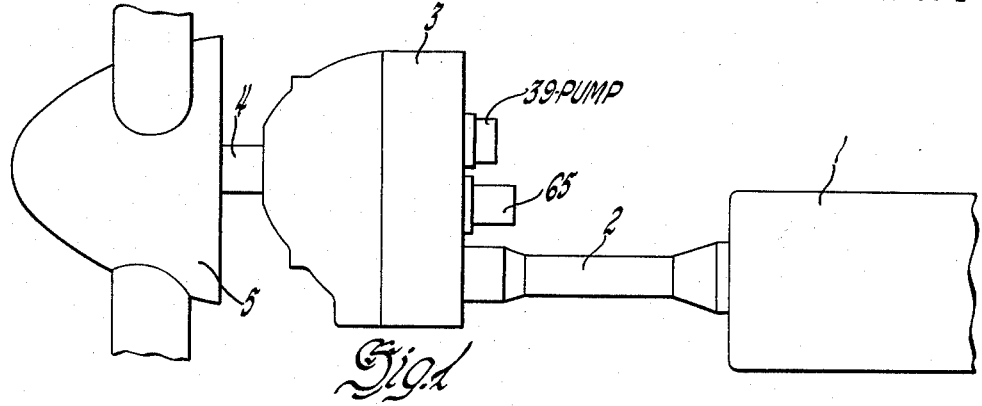
Fig. 1 is a schematic representation of a power plant incorporating the invention.

Referring now to the drawings in detail and more particularly to Fig. 1, an engine 1 is connected by means of a drive shaft enclosed in a housing 2 to a power transmission unit, including reduction gearing, enclosed in a case 3. The power transmission unit connects the engine drive shaft to a propeller shaft 4 which drives a variable pitch propeller 5.

Figure 2:
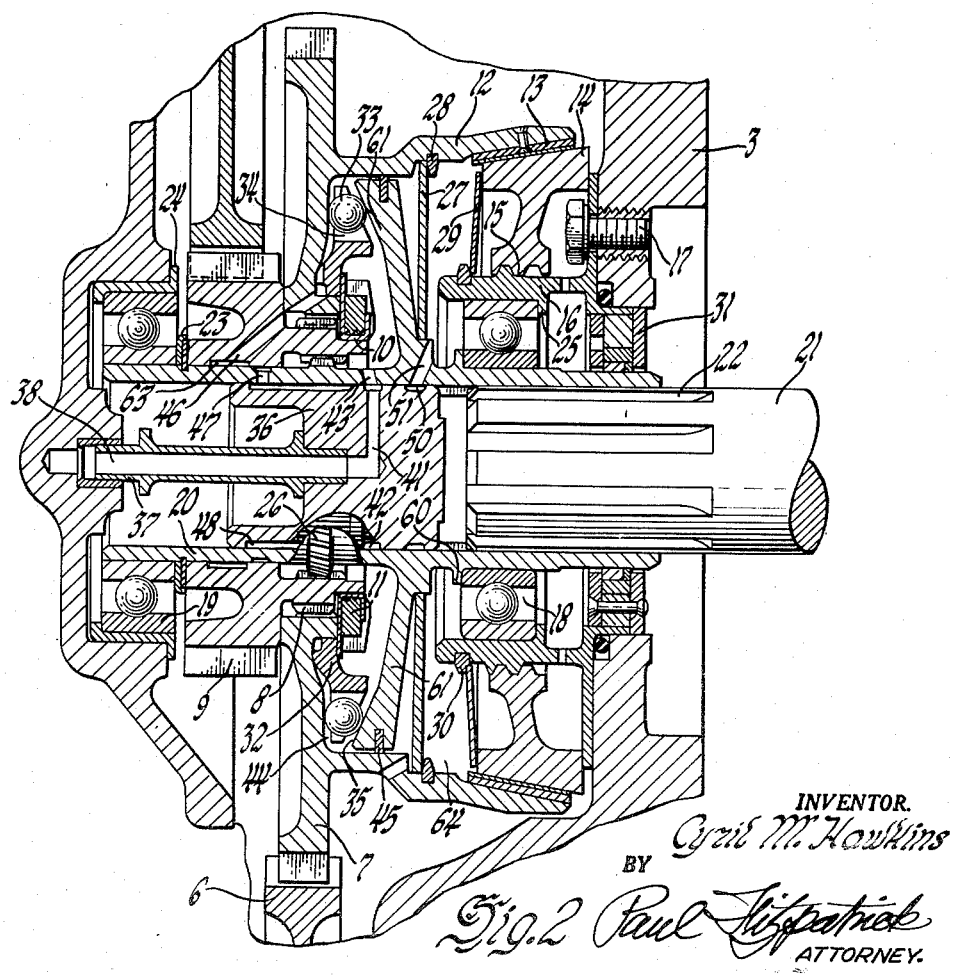
Fig. 2 is a sectional view of the brake mechanism located in the power transmission unit of the power plant.

Referring to Fig. 2, there is shown the upper portion of a gear 6 that is connected to continually rotate with the transmission drive train. Gear 6 is connected to a gear 7 internally connected by a spline 8 to an accessory drive gear 9. A lock washer 10 and nut 11 hold the gears 7 and 9 in close fitting relationship for common rotation and axial movement. The gear 7 has an annular flange portion 12 on the inside of which there is a conical friction surface 13. An inner annular brake element 14 having its outer surface conically formed is connected by helical splines 15 to a stationary sleeve member 16 attached to the stationary case 3 by bolts 17. Journalled in the transmission case 3 by a ball bearing 18 carried by the stationary sleeve 16 and a ball bearing 19 is a rotatable sleeve shaft 20. A starter shaft 21 is splined into one end of the sleeve shaft 20 by axial splines 22. As seen in Fig. 1, there is provided on the transmission a starter 65 which is connected through suitable means (not shown) to drive the starter shaft 21. The sleeve shaft 20 is prevented from axial movement to the left as viewed in Fig. 2 relative to the case 3 by means of lock rings 23, ball bearing 19, and abutment 24; and to the right by means of abutment 60 formed on the shaft 20, bearing 18, and abutment 25 carried by the stationary sleeve 16. It will thus be seen that the sleeve shaft 20 is mounted for rotation in the transmission case but is held against axial movement.

To sleeve shaft 20 has left-handed helical splines 26 of suitable angle thereon that engage cooperating internal splines in the accessory gear 9. When the starter shaft 21 and shaft 20 rotate to drive the power plant through the splines 26, gear 9, splines 8, gear 7 and gear 6, the splines 26 will provide an axial thrust on the gear element 9 causing it, the gear 7, flange 12 and friction surface 13 to move to the left as viewed in Fig. 2.

A Belleville spring 27 is located between the outer brake element 12 and a flange 61 on the sleeve shaft 20. The spring 27 normally reacts against the axially stationary flange 61 to move the outer brake element 12, by means of a ring 28, into engagement with the intermediate brake element 14. This provides a yielding braking force that prevents windmilling in a normal direction of an inoperative power plant. The left-hand helical spline 15 of suitable angle connects the intermediate element 14 and the stationary sleeve 16. By rotating the propeller blades slightly past full-feathered position during flight a reverse rotation can be impressed on the brake which will cause the intermediate element 14 to move toward the propeller, or to the left as viewed in Figs. 2 and 3, along the splines 15. This causes braking contact between element 14 and the outer brake element 12. These elements then both move to the left until limited by stop ring 23. The reaction on the spline 15 is carried to the case 3 through the sleeve 16.

Figure 3:
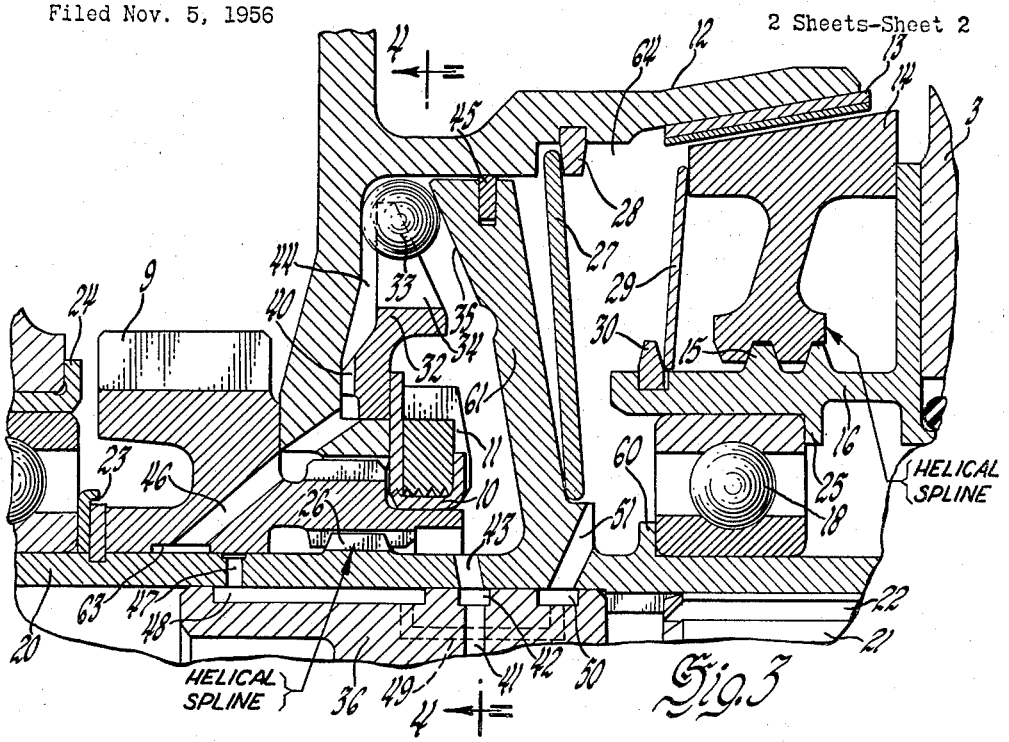
Fig. 3 is an enlarged partial view of the braking mechanism of Fig. 2.

A second Belleville spring 29 is carried by the stationary sleeve 16 and abuts a stop ring 30 held by the sleeve 16. The outer periphery of the spring 29 bears against the intermediate brake element 14 to maintain it normally in its right hand position or disengaged position relative to the stationary element 16 as viewed in Figs. 2 and 3. This prevents dragging of the brake during normal operation. When reverse rotation of the propeller causes the helical spline 15 to move the intermediate element 14 to the left, the force of the spring 29 is overcome, and upon forward rotation of the propeller the spring 29 returns the member 14 to its right-hand position as shown in Figs. 2 and 3.

Figure 4:
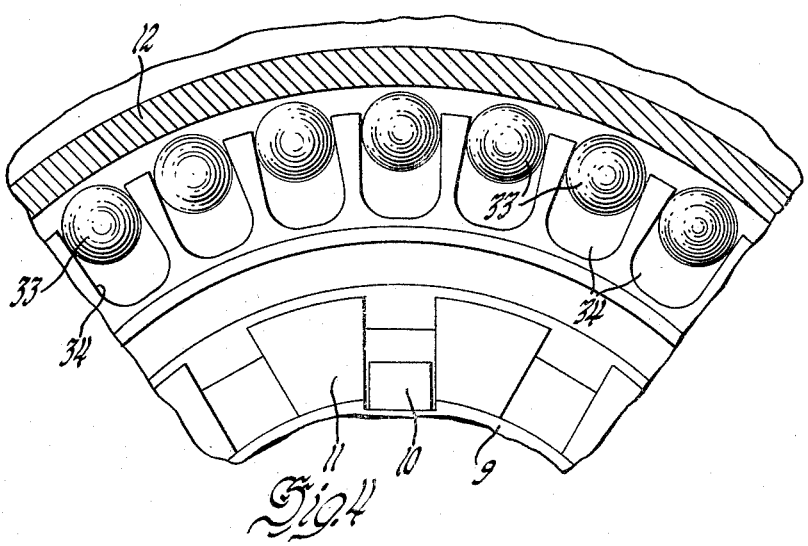
Fig. 4 is a sectional view taken on the line 4—4 of Fig. 3.

Located between the gear 7 and the flange 61 is a ball carrier or spacer 32 which is fastened to the gear 7 by the lock washer 10 and the nut 11. As shown in Fig. 4 the ball carrier has a plurality of circumferentially spaced slots 34 in its outer periphery. Each of these slots carries in it a steel ball 33 which bears against the gear 7 and against an inclined cam surface 35 on the reaction flange 61. The balls are free to move radially in and out in the slots 34, their motion outward being due to centrifugal force created by their rotation with the spacer 32. Because the balls act on the inclined cam surface 35 there will be an axial component of the centrifugal force acting to urge elements 7 and 61 apart against the force of spring 27. When the outer brake element 12 is in the disengaged position of Fig. 3 gear 7 is spaced from the inclined surface 35 sufficiently to allow the balls to move radially outward to the position as shown in Fig. 3. When the brake is applied, as shown in Fig. 2, the balls are prevented from moving outward by the inclined surface 35 and are located as shown in Fig. 2.

During starting operation inertia forces will cause the ball carrier 32 and balls 33 to turn relative to the inclined cam surface 35 due to the action of starter spline 26. This relative motion between the balls and the mating cam surface 35 provides a more consistent brake action since the balls can in effect roll radially rather than slide.

Fixed within the sleeve shaft 20 is a distributor core or plug 36 which receives a slip tube 37 that is rotatably inserted in the case 3. The slip tube 37, plug 36 and sleeve shaft 20 rotate as a unit. Slip tube 37 has a conduit 38 that is connected to a pressure pump 39 shown diagrammatically in Fig. 1. The pump 39 is driven by the gear train in the transmission and operates to provide a variable hydraulic pressure depending on the speed of the engine and the propeller. Thus, the pressure produced by pump 39 rises from a zero pressure with the engine and propeller stationary up to a maximum pressure with the engine and propeller operating at maximum speeds. The core or plug 36 has a drilled passage 41 connecting an annular groove 42 to the conduit 38. One or more holes 43 in the sleeve shaft 20 connect the groove 42 to a chamber 44 formed by the gear 7, its flange 12, the sleeve shaft 20, and its flange 61. The flange 61 carries a seal ring 45 to prevent leakage past the piston. When the power plant is in operation oil under pressure from pump 39 flows through passages 38, 41, groove 42, passages 43 into the chamber 44 where the oil pressure acts on the gear 7 to move it and the flange 12 to the left as viewed in Figs. 2 and 3, disengaging the brake elements 13 and 14. The reaction of the brake releasing force is transferred to the case 3 by the flange 61, sleeve shaft 20, abutment 60, ball bearing 18, abutment 25 and sleeve 16. It will be seen that when the pump 39 is rotating fast enough to create a pressure in chamber 44 high enough to overcome the spring 27 the pressure will move the gear 7, flange 12, and friction surface 13 away from the inner brake element 14.

Because the oil in chamber 44 rotates with the gear 7 and spacer 32 a centrifugal oil pressure is created in addition to the static oil pressure produced by pump 39. This centrifugal pressure aids in maintaining the outer brake element 12 in its released position even though the supply from pump 39 should be cut off thus losing the static pressure in chamber 44.

When the brake is in its released position, as shown in Fig. 3, the balls 33 will tend to move outward, due to centrifugal action, into the position shown in Fig. 3 and will aid the static pressure from pump 39 and the centrifugal pressure due to rotation of fluid in chamber 44 to hold the brake released. Upon engine failure or shutdown the centrifugal force of the oil in chamber 44 along with the axial component of the centrifugal force exerted by the balls 33 acting on cam surface 35 will maintain the brake disengaged until these forces have decreased to a point where they will be overcome by the force of spring 27, at which time the spring 27 will move the gear 7 and flange 12 to reapply the brake.

This brake application speed of rotation of the gear 7 and, hence, the propeller, is lower than that at which the brake would re-engage due to the action of either the pressure of the oil or the centrifugal force of the balls acting alone. This helps to minimize brake wear. If during flight there is a temporary interruption of the oil supply from pump 39 the balls ensure that the brake will not be applied and, consequently, be damaged unless the propeller is rotating at a relatively low speed.

The gears 7 and 9 have one or more passages 46 drilled therethrough which communicate between slots 40 and an internal groove 63 in the hub of gear 9. Sleeve shaft 20 has one or more passages 47 communicating with a groove 48 around the distributor plug 36 which connects by means of passage 49 to a second groove 50 around the distributor plug 36 that in turn communicates with one or more holes 51 drilled in the sleeve shaft 20. With the brake applied as shown in Fig. 2, the gear 9 is located so that passage 46 and groove 63 communicate with the passages 47 in the sleeve shaft 20. At this time a limited amount of oil from the chamber 44 is channeled through the slots 40, passages 46, groove 63, passage 47, groove 48, passage 49, groove 50 and holes 51 into space 64 where the oil provides for cooling and lubrication of the bearing 18 and from where it flows through grooves (not shown) in the brake surface 13 to provide cooling of the brake. When the brake is disengaged and the gears 7 and 9 move to the left to the position shown in Fig. 3 the groove 63 is moved out of alignment with the passages 47 and the cooling oil is then shut off.

The operation of the brake as exemplified in the preferred embodiment described above is as follows: When the aircraft is on the ground with the power plant stopped and the propeller stationary the pump 39 will be stopped. Thus, no hydraulic pressure is introduced into chamber 40, the balls 33 will be at rest in the bottom of their respective slots 34 and spring 27 will move the outer brake member 12 to engage the inner brake element 14 locking the propeller from rotation in either direction. To start the engine the starter 65 is energized turning shaft 21, sleeve 20 and, through helical splines 26, gears 9 and 7. Gear 7 transmits the starter drive to gear 6 connected to the power train in the transmission turning both the engine and the propeller. The torque transmitted from the sleeve shaft 20 through the helical splines 26 to the gear 7 causes the gear 7 and outer brake flange 12 to move to the left or disengaged position releasing the brake. At the same time, pump 39 will gradually build up pressure which will be introduced into chamber 44 and, as the engine picks up and fires, the pressure in chamber 44 will build up to maintain the brake released. Simultaneously, centrifugal pressure of the oil will build up as the speed of gear 7 increases and the axial centrifugal force of the balls 33 will increase also helping to maintain the brake released.

Upon temporary disruption the supply of pressure from pump 39 the centrifugal pressure of oil in chamber 44 as well as the axial component of the centrifugal force of the balls 33 will maintain the brake released. If during flight the propeller blades are rotated past the full-feathered position, spring 27 will apply the brake with sufficient force to drag the intermediate element around reversely whereby helical splines 15 will act to force the inner brake element 14 to the left further engaging the brake and preventing any reverse rotation of the propeller and thereby preventing reverse operation of the engine. This brake applying force increases with any tendency of the propeller to rotate reversely and is considerably greater than the braking force due to the application of the brake by spring 27 which is primarily utilized to hold the propeller stationary while on the ground.

During engine shutdown as the speed of the propeller and engine is reduced and the oil pressure in chamber 44 decreases the brake is maintained released until the force of spring 27 overcomes the combined forces of the pressure from pump 39, the centrifugal pressure of the oil in chamber 44 and the axial component of the centrifugal force from the ball 43. Upon further reduction of speed the brake gradually is engaged with increasing force until it can be stopped. Full force of spring 27 is exerted on the brake to hold it engaged. During brake application the brake is cooled due to the supply of oil from chamber 44 through the valved passages into space 64.

The invention simplifies the supervision of the braking apparatus of the power plant by the pilot by automatically controlling the apparatus in accordance with the manner in which the power plant is operated; that is, the apparatus is subservient to the operating conditions existing in the engine and the propeller rather than direct manual control. The invention provides for simpler and faster operation in the art of aircraft propulsion and the principles of the invention may easily be utilized in other arts through the use of ordinary skill.

It will be apparent to those skilled in the art that many modifications of the system and components thereof may be made within the scope of the invention which is not to be considered as limited by the detailed description of the preferred embodiment.

I claim:

1. In a propeller drive, a propeller, a brake connected to said propeller, brake applying means connected to said brake to apply the same, power means connected to said brake to hold the brake in released position, and hydraulic pressure means connected to said brake and actuated by rotation of said propeller above a predetermined speed to prevent brake application, said last mentioned means including cam means centrifugally actuated by rotation of said propeller to hold the brake in released position.

2. In a propeller drive, a propeller, a brake connected to said propeller, a power plant adapted to drive said propeller, means connected to said brake to actuate the same, self-energizing means responsive to reverse propeller rotation connected to said brake to provide additional actuating force when the propeller rotates in a reverse direction, hydraulic pressure means connected to said brake and said power plant responsive to power plant operation to release said brake, and means connected to said brake and actuated by rotation of the propeller above a predetermined speed to hold said brake released, said last mentioned means including centrifugally operated cam means.

3. In a propeller drive, a propeller, a brake for said propeller, a power plant adapted to drive said propeller, means connected to said brake to actuate the same, self-energizing means responsive to reverse propeller rotation connected to said brake to provide additional actuating force when the propeller rotates in a reverse direction, power means connected to said brake and said power plant responsive to power plant operation to release said brake, first hydraulic pressure means connected to said brake and responsive to high speed propeller rotation to hold said brake in released position on failure of said power means during high speed rotation of said propeller, and second means independent of said first means connected to said brake and responsive to high speed propeller rotation to aid the first means in holding said brake in released position on failure of said power means.

4. In a propeller drive, a propeller, a brake for said propeller, brake applying means connected to said brake to apply the same, a source of fluid under pressure, fluid pressure responsive means connected to said source and to said brake to release the same, and centrifugally actuated cam means responsive to propeller rotation above a predetermined speed connected to said brake to hold said brake released on loss of pressure from said source.

5. In a propeller drive, a propeller, a brake for said propeller, brake applying means connected to said brake to apply the same, a power plant adapted to drive said propeller, a starter for said power plant, means responsive to starter operation connected to said brake to release the same on starter operation, power means responsive to power plant operation connected to said brake to hold said brake released upon operation of said power plant, and centrifugally actuated cam means responsive to propeller rotation above a predetermined speed connected to said brake to hold said brake released upon failure of said power means.

6. In a propeller drive, a propeller, a brake for said propeller, brake applying means connected to said brake to apply the same, a power plant adapted to drive said propeller, a starter for said power plant, means responsive to starter operation connected to said brake to release the same on starter operation, power means responsive to power plant operation connected to said brake to hold the brake released upon operation of said power plant, means responsive to reverse propeller rotation connected to said brake to overcome said power means and apply said brake upon reverse rotation of said propeller, and centrifugally actuated cam means responsive to propeller rotation above a predetermined speed for holding said brake released upon failure of said power plant.

7. A power transmission unit comprising a power input shaft, a power output shaft, a brake for said output shaft, a third shaft for driving the input shaft, means operated by initial rotation of the third shaft to release the brake, centrifugal cam means actuated by said output shaft rotation to maintain the brake released, and additional fluid pressure means actuated by said output shaft rotation to maintain the brake released.

8. A power transmission unit comprising a power input shaft, a power output shaft, a brake for said output shaft, first means normally applying said brake with a relatively low force, second applying means operated by reverse rotation of said output shaft for applying said brake with a relatively high force, third means operated by forward rotation of either said input or said output shaft for overcoming said first applying means to release said brake, said first and second applying means together providing applying force greater than the releasing force of the third means, and centrifugal responsive cam means responsive to output shaft forward rotation above a predetermined speed to hold said brake released upon temporary failure of said third means.

9. A power plant comprising an engine, a power output shaft coupled to the engine, a brake for the power output shaft, a starter for the engine, means actuated by initial rotation of the starter to release the brake when the starter is energized, fluid pressure means to maintain the brake released when the power plant is operative, and mechanical centrifugally actuated means responsive to rotation of said output shaft to maintain the brake when the output shaft rotates above a predetermined speed.

10. A power plant comprising an engine, a power output shaft coupled to the engine, a brake for the power output shaft, a starter for the engine, helical spline means driven by the starter to release the brake when the starter is energized, means driven by the output shaft for supplying fluid under pressure, means actuated by the fluid under pressure to maintain the brake released, and centrifugal cam means driven by the output shaft to maintain the brake released.

11. In a brake, a first brake element, a second brake element, said brake elements being mounted for relative rotation about a common axis, brake applying means connected to a first one of said elements to move said one element along said axis into engagement with the second of said elements, means connected to said second element to move the same on said axis to increase the braking force responsive to relative direction of rotation of said brake elements, and means connected to said first element to move the same on said axis to decrease the braking force, said last mentioned means including cam means carried by one of said elements responsive to the rotation of said one element above a predetermined speed to hold said elements out of engagement.

12. In a brake, a stationary element, a rotatable brake element adapted to be braked, an intermediate brake element carried by said stationary element and mounted thereon for limited rotational and axial movement relative thereto, a rotatable reaction member, said rotatable element and said reaction member forming an expansion chamber, means connected to said rotatable element and said reaction member to urge said rotatable element in a direction to contract said chamber, said chamber contraction acting to engage said rotatable element and said intermediate brake element, a source of fluid under pressure, said source being connected to said chamber to cause expansion of the same and thereby act to disengage said rotatable element and said intermediate element, and centrifugal ball cam means carried by said rotatable element in said chamber responsive to rotation of said element to hold said chamber expanded upon failure of said source of pressure.

13. In a brake, a rotatable element, a relatively stationary element, spring means to move said elements into engagement, fluid pressure means to move said elements out of engagement, and cam means carried by said rotatable element and responsive to the speed of rotation thereof to hold said elements out of engagement upon failure of said fluid pressure means.

14. In a brake, a stationary element, a rotatable brake element adapted to be braked, an intermediate brake element carried by said stationary element and mounted thereon for limited rotational and axial movement relative thereto, a rotatable reaction member, said rotatable element and said reaction member forming an expansion chamber, means connected to said rotatable element and said reaction member to urge said rotatable element in a direction to contact said chamber, and simultaneously engage said rotatable element with said intermediate brake element, a source of fluid under pressure, said source being connected to said chamber to cause expansion of the same and simultaneously disengage said rotatable element from said intermediate element, and centrifugal ball cam means carried by said rotatable element in said chamber between said rotatable element and said reaction member responsive to rotation of said rotatable element to hold said chamber expanded and said rotatable element disengaged from said intermediate element upon failure of said source of pressure.

15. In a brake a rotatable member adapted to be braked, a relatively stationary member, said rotatable and stationary members having cooperatnig surfaces adapted to be engaged for stopping rotation of said rotatable member, said rotatable member having a portion forming a wall of an annular chamber, a rotatable reaction element forming an opposite wall of said chamber, said reaction element having a cam surface facing said rotatable wall portion and being spaced at its radially outer end closer to the rotatable wall portion than the radially inner end is spaced from the rotatable wall portion, a spacer carried by said rotatable member in said chamber intermediate said walls having circumferentially spaced radially extending slots in its outer peripheral surface, balls in said slots proportioned to contact said rotatable wall portion and said cam surface, whereby rotation of said rotatable member, spacer and balls causes centrifugal movement of said balls in said slots to a position wherein the balls contact said cam surface and said rotatable wall portion where they are spaced the closest, means for moving said rotatable wall portion toward said reaction element to engage said cooperating surfaces to stop said rotatable member, means to supply fluid under pressure to said chamber to provide a static pressure to move said rotatable wall portion away from said reaction element to disengage said cooperating surfaces and allow said balls to centrifugally move outward, said fluid under pressure in said chamber being responsive to rotation of said rotatable element to effect a centrifugal pressure to aid the static pressure in maintaining the cooperating surfaces disengaged, whereby said balls and said centrifugal pressure together acting to maintain said cooperating surfaces disengaged upon failure of said source of fluid under pressure until the speed of rotation of said rotatable member has been reduced to a sufficiently low value so that the means for engaging the surfaces overcomes the combined effect of the centrifugal force of the balls and the centrifugal pressure and acts to engage the surfaces.

References Cited in the file of this patent

UNITED STATES PATENTS

| | | |
|---|---|---|
| 2,702,100 | Montieth | Feb. 15, 1955 |
| 2,725,516 | Chillson | Feb. 21, 1956 |
| 2,737,018 | Bain | Mar. 6, 1956 |
| 2,826,255 | Peterson | Mar. 11, 1958 |